US012618030B2

(12) United States Patent
Bishop et al.

(10) Patent No.: US 12,618,030 B2
(45) Date of Patent: *May 5, 2026

(54) SONIC INFUSION OF ALCOHOL

(71) Applicant: American Metal Whiskey LLC, Ridgefield, CT (US)

(72) Inventors: Chris Bishop, Ridgefield, CT (US); Randy Carlson, Ridgefield, CT (US); James Greco, Whitestone, NY (US)

(73) Assignee: American Metal Whiskey LLC, Danbury, CT (US)

( * ) Notice: Subject to any disclaimer, the term of this patent is extended or adjusted under 35 U.S.C. 154(b) by 367 days.

This patent is subject to a terminal disclaimer.

(21) Appl. No.: 17/869,374

(22) Filed: Jul. 20, 2022

(65) Prior Publication Data

US 2024/0294857 A1    Sep. 5, 2024

Related U.S. Application Data

(60) Provisional application No. 63/223,757, filed on Jul. 20, 2021.

(51) Int. Cl.
| | |
|---|---|
| *C12H 1/22* | (2006.01) |
| *A23L 5/30* | (2016.01) |
| *C12G 3/07* | (2006.01) |
| *H04R 1/02* | (2006.01) |

(52) U.S. Cl.
CPC ................. *C12H 1/22* (2013.01); *A23L 5/32* (2016.08); *C12G 3/07* (2019.02); *H04R 1/028* (2013.01)

(58) Field of Classification Search
CPC . C12H 1/22; C12H 1/165; C12G 3/07; C12G 3/08; H04R 1/028; A23L 2/50; A23L 5/32
See application file for complete search history.

(56) References Cited

U.S. PATENT DOCUMENTS

| | | | | |
|---|---|---|---|---|
| 2,086,891 | A | * | 7/1937 | Bachmann ............... C12H 1/16 99/DIG. 12 |
| 2,088,585 | A | * | 8/1937 | Chambers ................ C12H 1/16 426/238 |
| 2,138,051 | A | | 11/1938 | Williams |
| 2,693,943 | A | | 11/1954 | Fowle |

(Continued)

FOREIGN PATENT DOCUMENTS

| | | |
|---|---|---|
| DE | 202019000621 | 3/2019 |
| EP | 0336262 | 3/1989 |

(Continued)

OTHER PUBLICATIONS

Translation of DE 202019000621U1 (Year: 2019).*

(Continued)

*Primary Examiner* — Drew E Becker
(74) *Attorney, Agent, or Firm* — Meister Seelig & Schuster PLLC

(57) ABSTRACT

A system to treat spirits with sound waves including a wooden barrel configured to hold the spirits, and at least one speaker disposed outside of the barrel, the speaker being configured to play a repeated pattern of sound into the spirits inside the barrel, the repeated pattern of sound being configured to encourage the spirits to interact with the wood of the barrel.

19 Claims, 4 Drawing Sheets

(56) References Cited

U.S. PATENT DOCUMENTS

| | | | | |
|---|---|---|---|---|
| 2,775,434 | A * | 12/1956 | Probst | B06B 1/0655 |
| | | | | 366/127 |
| 4,576,824 | A | 3/1986 | Gubiev et al. | |
| 7,063,867 | B2 | 6/2006 | Tyler, III et al. | |
| 7,220,439 | B2 | 5/2007 | Leonhardt et al. | |
| 9,637,712 | B2 | 5/2017 | Davis | |
| 9,637,713 | B2 | 5/2017 | Davis | |
| 10,041,027 | B2 | 8/2018 | Evans et al. | |
| 10,087,406 | B2 | 10/2018 | Bailey et al. | |
| 10,196,595 | B2 | 2/2019 | Butte | |
| 10,508,259 | B2 | 12/2019 | Davis | |
| 10,544,386 | B2 | 1/2020 | Davis | |
| 10,604,730 | B2 | 3/2020 | Bailey et al. | |
| 10,889,787 | B2 | 1/2021 | Fearnside et al. | |
| 10,947,488 | B2 | 3/2021 | Davis | |
| 11,214,766 | B2 | 1/2022 | Evans et al. | |
| 11,339,359 | B2 | 5/2022 | Davis | |
| 11,649,422 | B2 | 5/2023 | Bailey et al. | |
| 2006/0165855 | A1 | 7/2006 | Leonhardt et al. | |
| 2008/0008796 | A1 * | 1/2008 | Cassone | A23L 5/32 |
| | | | | 426/237 |
| 2015/0264968 | A1 * | 9/2015 | Shuntich | A23L 5/32 |
| | | | | 99/275 |
| 2016/0081373 | A1 * | 3/2016 | Coyne | C12H 1/165 |
| | | | | 99/451 |
| 2016/0129407 | A1 | 5/2016 | Wrosch et al. | |
| 2016/0355771 | A1 | 12/2016 | Davis | |
| 2016/0376538 | A1 * | 12/2016 | Niazi | C12H 1/22 |
| | | | | 99/277.1 |
| 2017/0369831 | A1 * | 12/2017 | Dhesi | C12M 35/04 |
| 2018/0051240 | A1 | 2/2018 | Au | |
| 2019/0292503 | A1 * | 9/2019 | Lehman | C12G 3/04 |
| 2020/0071645 | A1 * | 3/2020 | Meyer | B01F 31/86 |
| 2021/0102148 | A1 | 4/2021 | Fearnside et al. | |
| 2021/0179985 | A1 | 6/2021 | Haller | |
| 2021/0321648 | A1 * | 10/2021 | Martin | A21D 6/00 |
| 2022/0053802 | A1 * | 2/2022 | Wampfler | A23C 9/12 |
| 2022/0411731 | A1 * | 12/2022 | Lye | C12H 1/16 |
| 2023/0100879 | A1 | 3/2023 | Lehman | |
| 2023/0167388 | A1 | 6/2023 | Pizon et al. | |
| 2024/0240122 | A1 * | 7/2024 | Bishop | C12H 1/16 |

FOREIGN PATENT DOCUMENTS

| | | | | |
|---|---|---|---|---|
| EP | 469585 | A * | 2/1992 | A23L 2/50 |
| EP | 477583 | A * | 4/1992 | A23L 2/50 |
| FR | 3035119 | | 4/2015 | |
| KR | 100628342 | | 11/2006 | |
| WO | WO2005039789 | | 5/2005 | |
| WO | WO-2005039789 | A1 * | 5/2005 | C12H 1/22 |
| WO | WO2016024084 | | 2/2016 | |

OTHER PUBLICATIONS

Translation of FR 3035119A1 (Year: 2016).*

Allison Shoemaker, "TIL you can speed-age whiskey with sound waves," https://thetakeout.com/til-you-can-speed-age-whiskey-with-sound-waves-1826642625; published Jun. 7, 2018.

Brad Japhe, "How Distilleries Use Hip-Hop, EDM and Reggae to Age Booze," https://www.billboard.com/music/music-news/distilleries-using-music-to-age-booze-8460802/; published Jun. 20, 2018.

Thom Dunn, "Metallica releases a new whiskey aged on the sounds of heavy metal," https://boingboing.net/2022/05/23/metallica-releases-new-whiskey-aged-on-the-sounds-of-heavy-metal.html; published May 23, 2022.

Christopher Osburn, "Loud Music is the Key Ingredient in This Distiller's Brandy," https://www.thrillist.com/drink/nation/aging-liquor-using-music-sonic-aging; published Oct. 8, 2015.

Copper and Kings website, "Copper & Kings American Craft Brandy," https://www.copperandkings.com/our-craft; archived website from Feb. 7, 2021.

Dark Island Spirits webpage, "Musically Matured," https://www.darkislandspirits.com/musically-matured; archived website from Dec. 1, 2019.

Tara Nurin, "Now You Can Taste Aged Whiskey Without the Age," https://www.forbes.com/sites/taranurin/2018/05/31/how-you-can-taste-aged-whiskey-without-the-age/?sh=744432223efe; May 31, 2018.

Lewin Day, "Aging Alcohol in 30 Minutes," https://hackaday.com/2019/11/14/aging-alcohol-in-30-minutes/; Nov. 14, 2019.

Harrison Williams, "Distilleries are Using Music to Age Alcohol with 'Sonic Aging'"; https://mixmag.net/read/distilleries-are-using-music-to-age-alcohol-with-sonic-aging-news; Jun. 20, 2018.

M.J. Delgado-Gonzalez, M.M. Sanchez-Guillen, M.V. Garcia-Moreno, M.C. Rodriguez-Dodero, C. Garcia-Barroso, D. A. Guillen-Sanchez; "Study of a laboratory-scaled new method for the accelerated continuous ageing of wine spirits by applying ultrasound energy"; Ultrasonics Sonochemistry 36 (2017) 226-235.

Jake Emen, "Rapid-Aging Whiskey Technology: Game Changer or Gimmick?"; https://thewhiskeywash.com/whiskey-styles/american-whiskey/rapid-aging-whiskey-technology-game-changer-gimmick/; Sep. 8, 2016.

Blackened Whiskey Website; "Black Noise"; https://blackenedwhiskey.com/black-noise/; accessed May 27, 2021.

Caskers Website, "Blackened American Whiskey"; https://www.caskers.com/blackened-american-whiskey/; accessed Apr. 12, 2021.

Translation of KR 100628342B1 (Year: 2006).

Series of photographs of package and bottle of Blackened Whiskey, all circa Feb. 2024.

Sound NPL, https://www.sciencelearn.org.nz/resources/2816-sound-wave-interference (Year: 2019).

* cited by examiner

SONIC INFUSION OF ALCOHOL

CROSS-REFERENCE TO RELATED APPLICATIONS

This application claims priority under 35 U.S.C. § 120 from U.S. Provisional Application No. 63/223,757, filed on Jul. 20, 2021, in the United States Patent and Trademark Office, the disclosure of which is incorporated herein in its entirety by reference.

BACKGROUND

Conventional processes to age alcoholic spirits involve storing the spirits in wooden barrels, otherwise known as "barrel aging." Since wood is naturally porous, over time the liquid spirits stored in the barrels moves in and out of the wood of the barrels, gaining particular color and flavor attributes therefrom. Different producers and different spirits use different wood and different aging times. For example, many American whiskeys are aged in charred oak barrels. Some whiskies, such as scotch, have a required minimum aging time before they are deemed fit for consumption.

Conventionally in barrel aging, the barrels and the spirits are left stationary with occasional hydration by misting or hosing water onto the barrels. The spirits are allowed to age naturally using time, temperature, and humidity to cause the spirits to move in and out of the wood of the barrel. There may be occasional movement of the barrels as they are moved from one part of a storage facility to another, either to rotate stock or to control the temperature and humidity the spirits stored in the barrels are exposed to. However, this movement is infrequent, and traditional methods of barrel aging rely primarily on static processes, i.e., allowing the spirits to sit undisturbed for an extended time.

A significant factor in barrel aging is the amount of interaction between the spirits and the wood of the barrel. Conventional methods of barrel aging increase this interaction by increasing the amount of surface area of the wood that is exposed to the spirits. For example, wood pieces may be added to the spirits in the barrel, or a batch of spirits may be stored in multiple small barrels instead of one large barrel. However, aside from increasing surface area, there is no conventional method to increase the interaction between the wood and the spirits.

Conventional methods of barrel aging have multiple drawbacks. First, it takes a significant amount of time for the spirits to interact sufficiently with the wood of the barrel to be properly aged-anywhere from weeks to years, depending on the spirit. During this time, some portion of the spirits is lost to evaporation-a portion known in the industry as the "angel's share." Furthermore, different climates lead to different results. For example, whiskey being aged in a hot and humid climate such as Kentucky will lose spirits to evaporation faster than whiskey being aged in a moderate or cold and dry environment such as Vermont. As a result, spirits have different characteristics depending on where they were barrel-aged.

As such, there is a need for a way to better control the barrel-aging process. This would allow distillers to account for the different environments the spirits are aging in and give better control over the spirits produced.

SUMMARY OF THE INVENTION

Exemplary embodiments of the present general inventive concept provide systems, methods, and devices which may generate movement of the spirits in a barrel to encourage the changes typically resulting from aging. Specifically, according to exemplary embodiments of the present general inventive concept, systems, methods, and devices use sound waves to encourage interaction between the spirits and the wood of the barrel.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system to treat spirits with sound waves, the system including a wooden barrel configured to hold the spirits, and at least one speaker disposed outside of the barrel, the speaker being configured to play a repeated pattern of sound into the spirits inside the barrel, the repeated pattern of sound being configured to encourage the spirits to interact with the wood of the barrel.

In an exemplary embodiment, the at least one speaker may be configured to play the repeated pattern of sound into the spirits through a wall of the barrel.

In an exemplary embodiment, the at least one speaker may be configured to play the repeated pattern of sound into the spirits through a hole in wall of the barrel.

In an exemplary embodiment, the system may further include an enclosure around the at least one speaker.

In an exemplary embodiment, the enclosure may be formed of a type of wood similar to the wood of the barrel.

In an exemplary embodiment, the system may further include at least one additional speaker disposed inside the barrel, the at least one additional speaker being configured to play the repeated pattern of sound into the spirits.

In an exemplary embodiment, the at least one speaker may be configured to be waterproof.

In an exemplary embodiment, the repeated pattern of sound may have a frequency ranging between about 60 Hz and about 4000 Hz.

In an exemplary embodiment, the repeated pattern of sound may be provided from a playback device in communication with the at least one speaker.

In an exemplary embodiment, the user may control the playback device to change qualities of the repeated pattern of sound.

The foregoing and/or other features and utilities of the present general inventive concept may be achieved by providing a system to treat spirits with sound waves, the system including a wooden barrel configured to hold the spirits, an anchor point disposed inside of the barrel, and at least one speaker disposed on the anchor point, the at least one speaker being configured to play a repeated pattern of sound into the spirits inside the barrel, the repeated pattern of sound being configured to encourage the spirits to interact with the wood of the barrel.

In an exemplary embodiment, the anchor point may be formed of a type of wood similar to the wood of the barrel.

The foregoing and/or other features and utilities of the present general inventive concept may be achieved by providing a method of treating spirits in a wooden barrel, the method including disposing at least one speaker outside of the barrel, and playing a repeated pattern of sound through the speaker and into the spirits inside the barrel, the repeated pattern of sound being configured to encourage the spirits to interact with the wood of the barrel.

BRIEF DESCRIPTION OF THE DRAWINGS

FIG. 1 illustrates a barrel and external speaker assembly according to an exemplary embodiment of the present general inventive concept;

DETAILED DESCRIPTION OF EXEMPLARY EMBODIMENTS OF THE INVENTIVE CONCEPT

Figure 2:
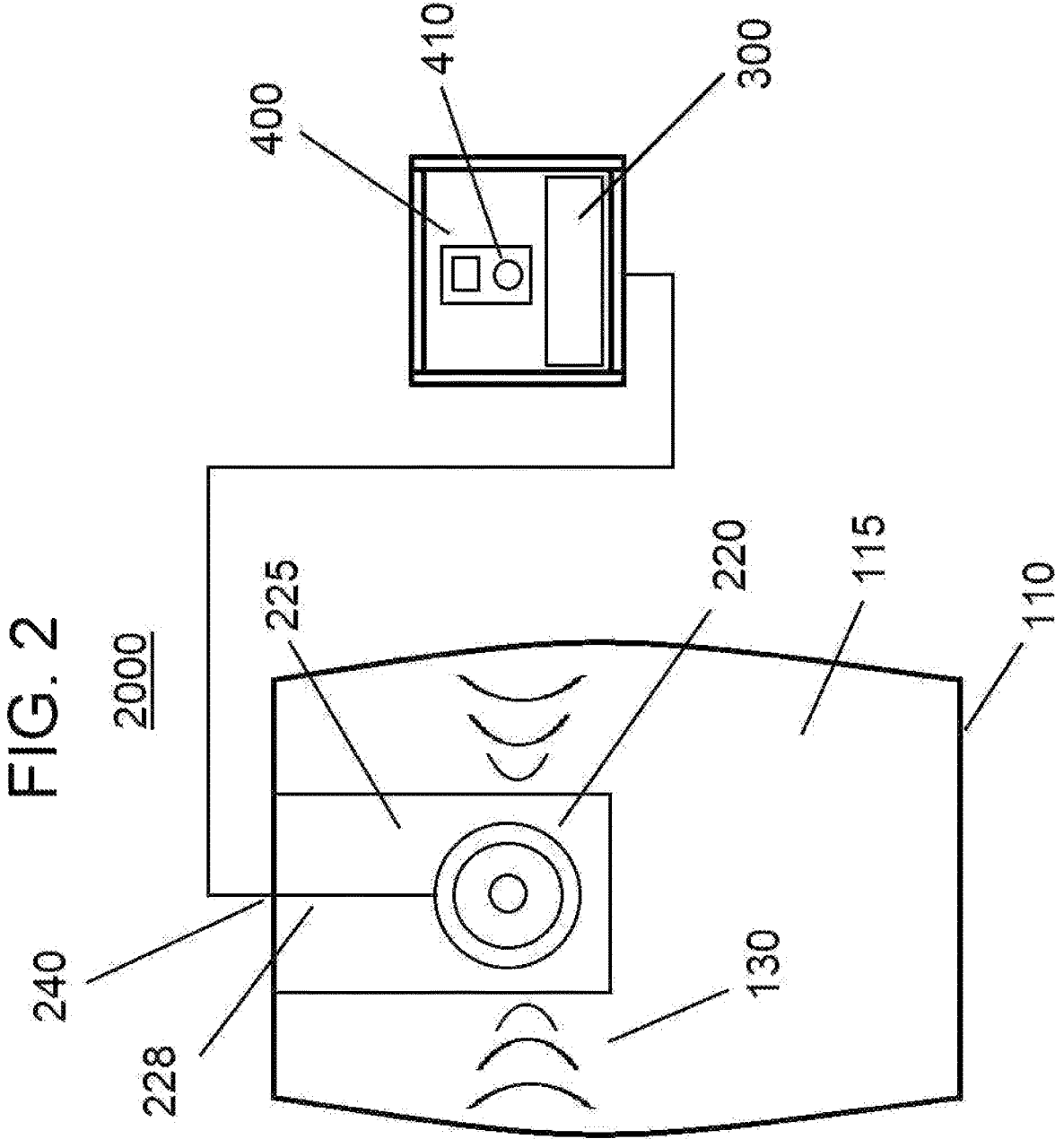
FIG. 2 illustrates a barrel and internal speaker assembly according to another exemplary embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, certain terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Figure 1:
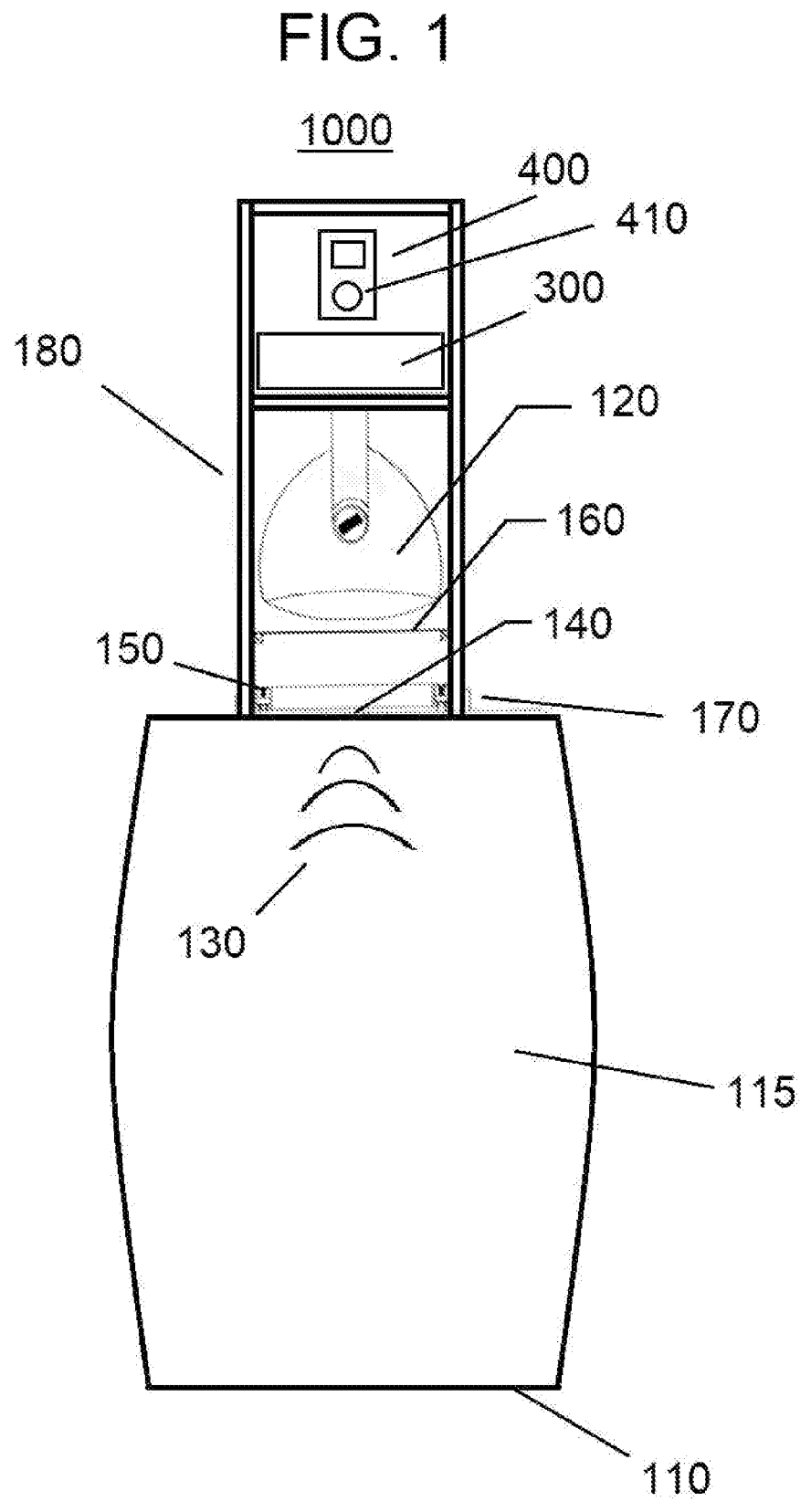

FIG. 1 illustrates a barrel 110 with an external speaker assembly 1000 according to an exemplary embodiment of the present general inventive concept. The barrel 110 may be made of any material suitable for barrel aging, e.g., charred oak. The barrel 110 may also be any size or shape according to the particular exemplary embodiment of the present general inventive concept. The barrel 110 may be partially or completely filled with liquid spirits 115. For the purposes of this disclosure, "spirits" or "liquid spirits" encompasses any liquid which may be aged in a wooden barrel, i.e., may be allowed to interact with the wood of the barrel 110 to gain particular characteristics therefrom. Examples of such spirits 115 include but are not limited to: whiskey, bourbon, rye, rum, tequila, cognac, brandy, gin, and juniver.

As illustrated in FIG. 1, according to exemplary embodiments of the present general inventive concept the speaker assembly 1000 may include one or more external speakers 120 located on the outside of the barrel 110, such external speaker(s) 120 being configured to play sound waves 130 into the spirits 115. The speaker(s) 120 may be constructed of any materials suitable to the specific exemplary embodiment of the present general inventive concept. The speaker(s) 120 may also be any size or shape suitable to the specific exemplary embodiment, and any number of speakers 120 may be used, in any configuration, based on the size of shape of the barrel 110 and the desired qualities of the sound waves 130. For the purposes of this disclosure, qualities of the sound waves 130 include but are not limited to frequency, volume, and/or duration of play.

According to exemplary embodiments of the present general inventive concept, the speaker(s) 120 may be located anywhere on the surface of the barrel 110, including along the curved sides or at one or more ends of the barrel 110, where the barrel surface may be flat. If the speaker(s) 120 are disposed in a location where they may come into contact with the spirits 115, e.g., on the side or bottom of the barrel 110, the speaker(s) 120 used may be waterproof. According to an exemplary embodiment of the present general inventive concept illustrated in FIG. 1, the speaker assembly 1000 may be located at an upper portion of the barrel 110, such that the speaker(s) 120 are separated from the spirits 115 inside of the barrel 110, and furthermore gravity does not push the spirits 115 against the speaker(s) 120. If the speaker(s) 120 are kept from physically contacting the spirits 115, the speaker(s) 120 may not need to be waterproof to function reliably.

The sound waves 130 may comprise a repeated pattern of sound. The sound waves 130 may be a specific sound such as, for example, the exhaust note of a particular model of car, which may be looped or played repeatedly to extend the time the spirits 115 are exposed to the sound 130. The speaker(s) 120 may play the sound waves 130 into the wood of the barrel 110 to be transmitted into the spirits 115. Alternatively the speaker(s) 120 may play the sound waves 130 into the spirits 115 through a hole 140 cut into the wall of the barrel 110. The hole 140 may be approximately the shape of the speaker assembly 1000, such that the wall of the barrel 110 does not obstruct the speaker(s) 120, and the speaker(s) 120 may face the spirits 115 directly.

Playing the sound waves 130 into the spirits 115 may introduce vibrations into the spirits 115. These vibrations may encourage the spirits 115 to move in and out of the wood of the barrel 110, causing the spirits 115 and the wood to interact and exchange liquid, esters, and color, thereby encouraging the changes in the spirits 115 typically resulting from the barrel-aging process. This process of using sound waves 130 to encourage interaction between the spirits 115 and the barrel 110 may be referred to as sonic infusion of the spirits 115.

Sonic infusion may allow more control over the time and quality of the barrel aging of the spirits 115. By increasing the rate at which the spirits 115 interact with the wood, there may be greater transference of the character imparted by the wood barrel 110 in significantly less time than in conventional methods. Sonic infusion of the spirits 115 may thereby accelerate the changes typically resulting from barrel aging, reducing the time needed to barrel age the spirits 115 and in turn reducing the amount of spirits 115 lost to evaporation during the aging process. Furthermore, a user may control the qualities of the sound 130, including frequency, volume, duration, etc. For example, the user may replace a recording being used to produce the sound waves 130 with a different recording, the user may change the volume, etc. Different sound qualities may induce different vibrations in the spirits 115, which in turn may affect how the spirits 115 interact with the wood of the barrel 110. Sonic infusion thereby allows more control over how the spirits 115 interact with the wood of the barrel 110, which may allow greater control over the resultant characteristics of the spirits 115, e.g., flavor, color, smoothness, etc. That is, the qualities of the sound 130 may be changed as desired to control the rate at which the spirits 115 interact with the wood of the barrel 110, as well as control the characteristics of the spirits 115 resulting from the barrel aging.

The qualities of the barrel 110 being used, e.g., size, shape, and type of wood, may affect the sound waves 130 played into the spirits 115, as well as the characteristics of the spirits 115 themselves. Accordingly, exemplary embodiments of the present general inventive concept may use any number of different sizes and shapes of barrel 110, as well as any number of types of wood for the barrel 110.

The speaker assembly 1000 may further include a sound-proof seal 150, e.g., a rubber seal, provided around the perimeter of the speaker assembly 1000, to help keep all sound from the speaker(s) 120 contained in the area of the spirits 115. Furthermore, if the speaker(s) 120 are not waterproof, a liquid shield 160 may also be provided between the speaker(s) 120 and the spirits 115 to keep the speaker(s) 120 from being in direct contact with the spirits 115. The liquid shield 160 may be, e.g., a perforated metal sheet such as a screen which allows sound waves 130 from the speaker(s) 120 to pass therethrough, but blocks splashes or droplets of the spirits 115 from passing through to contact the speaker(s) 120.

As illustrated in FIG. 1, a speaker assembly 1000 may further include a power amplifier 300 and a playback device 400. The power amplifier 300 may amplify an external voltage to a level sufficient to power the speaker(s) 120. The amplifier 300 may be any such device suitable to power the speaker(s) 120 being used in the particular exemplary embodiment of the present general inventive concept. According to exemplary embodiments of the present general inventive concept, the playback device 400 may be, e.g., a smartphone, an mp3 player, or any other device capable of providing audio to the speaker(s) 120 to be played. The playback device 400 may also include a user interface 410 allowing a user to modify of the qualities of the sound waves 130, for example changing the volume, the frequency, which particular sound is being played, etc. The user interface 410 may be, e.g., controls disposed on the playback device 400 itself, or may be a remote device connected wirelessly to the playback device 400.

According to exemplary embodiments of the present general inventive concept, the playback device 400 may be self-contained, i.e., it may play pre-recorded sounds over the speaker(s) 120. This may allow a "set and forget" arrangement in which a user may set the playback device 400 to play a pre-recorded set of sound waves 130, after which the user may walk away and allow the spirits 115 to be treated with sonic infusion for a desired length of time. According to other exemplary embodiments of the present general inventive concept, the playback device 400 may be controllable, meaning the qualities of the sound waves 130 being played may be modified during the sonic infusion process. For example, while the spirits 115 are being treated a user may change the volume of the sound waves 130, change the frequency, change which sound is being played, etc. via a user interface 410 on the playback device. Controlling the qualities of the sound waves 130 in this manner allows for more precise control of the barrel aging process and the resulting spirits 115. For example, as the barrel aging process progresses, the spirits 115 may change in, for example, specific gravity or density due to evaporation. If the playback device 400 is controllable, the sound waves 130 may be adjusted as the barrel aging process progresses, thereby accounting for the changes in the spirits 115 and encouraging a desired optimum interaction between the spirits 115 and the barrel 110. Similarly, adjusting the sound waves 130 with the playback device 400 allows a user to readily adjust the sound waves 130 to account for the acoustics of different barrels 110, e.g., different barrel shapes, different types of wood, etc., and thereby the user may achieve the optimum desired interaction between the spirits 115 and the wood of the barrel 110.

Figure 3:
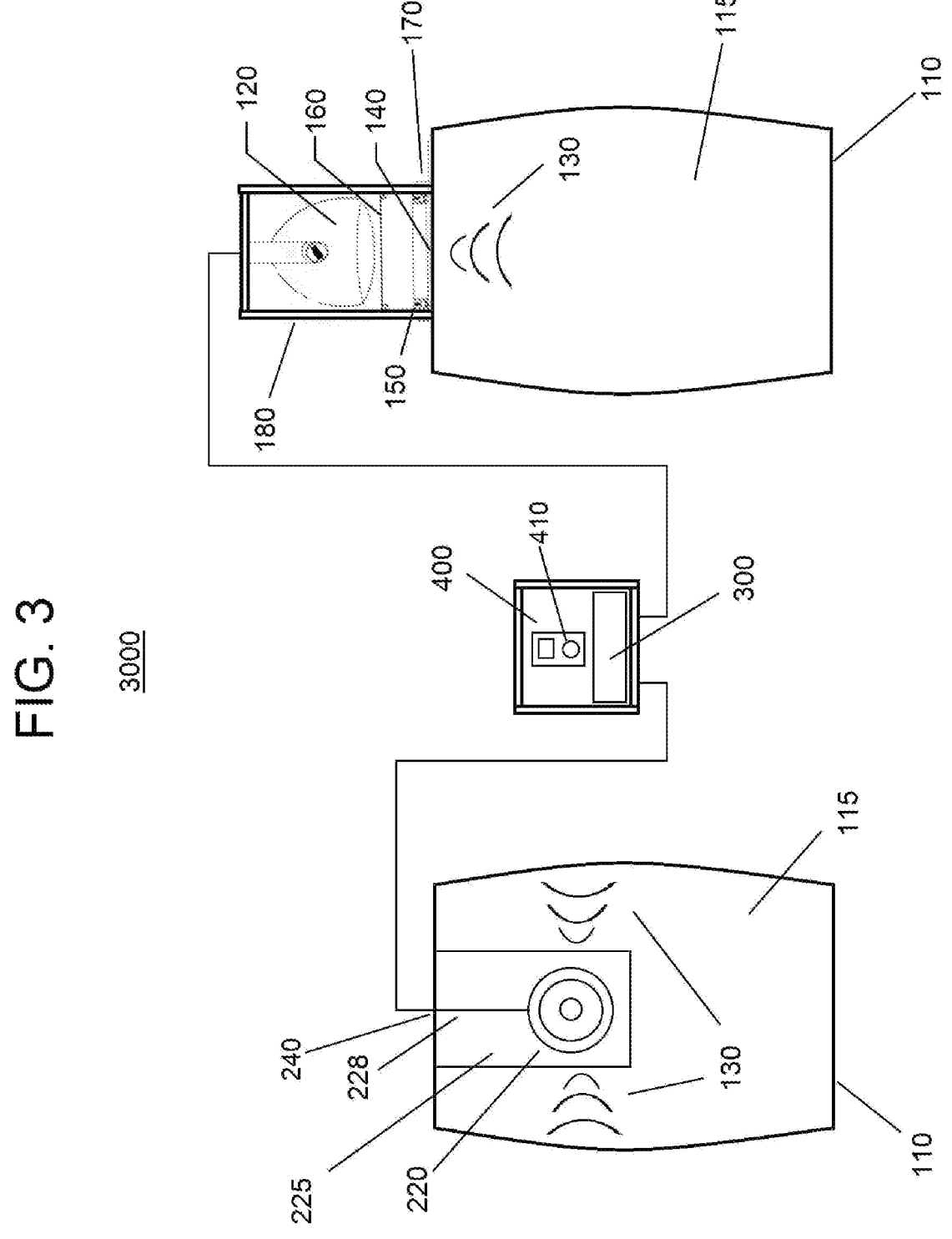
FIG. 3 illustrates a sonic infusion system including a plurality of barrels according to another exemplary embodiment of the present general inventive concept.
Figure 4:
FIG. 4 illustrates a barrel and speaker assembly according to another exemplary embodiment of the present general inventive concept.

According to exemplary embodiments of the present general inventive concept, the speaker assembly 1000 may include an enclosure 180, e.g., a box formed around the speaker(s) 120, to protect the speaker assembly 1000 from outside contamination, e.g., dust, dirt, etc., as well as to help maintain an airtight seal around the speaker(s) 120 to isolate the atmosphere over the spirits 115. The enclosure 180 may also reduce transmission of sound outside of the barrel 110 while sound waves 130 are being played into the spirits 115. According to exemplary embodiments of the present general inventive concept, the enclosure 180 may be open at the end facing the barrel 110, so as not to interfere with the transmission of sound waves 130 into the spirits 115. Furthermore, according to exemplary embodiments of the present general inventive concept, the speaker enclosure 180 may be formed from the same wood as the barrel 110, to help maintain consistent sound characteristics and to help match the natural expansion and contraction of the wood of the barrel 110 with heat and humidity. Furthermore, although in FIG. 1 the amplifier 300 and playback device 400 are illustrated inside the enclosure 180, according to other exemplary embodiments of the present general inventive concept the enclosure 180 may only enclose the speaker(s) 120, with the amplifier 300 and playback device 400 being located external to the enclosure 180. FIGS. 3 and 4, described below, illustrate exemplary embodiments of the present general inventive concept with an amplifier 300 and playback device 400 disposed outside of the enclosure 180.

The enclosure 180 may be affixed to the barrel 110 with clamps 170. The enclosure 180 may be removed from the barrel 110 by disengaging the clamps 170, such that the enclosure 180 may be removed from the barrel 110 without compromising the structure of the barrel 110 itself. The clamps 170 thereby may help keep the environment around the spirits 115 stable and isolated from the outside air. The enclosure 180 may therefore be replaced or worked on without compromising the atmosphere around the spirits 115, which may affect the barrel-aging process.

FIG. 2 illustrates a barrel 110 and internal speaker assembly 2000 according to another exemplary embodiment of the present general inventive concept. As illustrated therein, according to this exemplary embodiment one or more internal speakers 220 are included inside the barrel 110, and play soundwaves 130 into the spirits 115. Although only one speaker 220 is illustrated, it will be understood that any number of speakers 220 may be included inside the barrel 110 in the manner shown. According to exemplary embodiments of the present general inventive concept, the barrel 110 and spirits 115 may be substantially the same as those described above with regard to FIG. 1.

The speaker(s) 220 may be constructed of waterproof, non-porous materials which will not interact with the spirits 115, thereby allowing the speaker(s) 220 to be immersed in the spirits 115. The speaker(s) 220 may be configured to play sound waves 130 directly into the spirits 115, thereby encouraging the spirits 115 to interact with the wood of the barrel 110. Although sound waves 130 may be played at a different volume or frequency to account for the different acoustics of the speaker(s) 220 being immersed in the spirits 115, the sound waves 130 may still encourage the spirits 115 to interact with the wood of the barrel 110 similarly to the exemplary embodiment discussed above with reference to FIG. 1.

As illustrated in FIG. 2, the speaker(s) 220 may be attached to one or more anchor points 225 which may be fastened securely in place, e.g., to one end of the barrel 110. The anchor point(s) 225 serve to hold the speaker(s) 220 in place in the barrel 110. The anchor point(s) 225 may be, e.g., a board affixed to one end of the barrel 110 and extending into the barrel's interior. According to exemplary embodiments of the present general inventive concept, the anchor point 225 may be made of the same wood as the rest of the barrel 110. According to exemplary embodiments of the present general inventive concept, the anchor point(s) 225 may be removable, e.g., by sliding the board out of the barrel 110 via an opening cut into the barrel 110. As a result, the internal speaker(s) 220 may be removed from the barrel 110 to be replaced or serviced without compromising the structure of the barrel 110.

The one or more speakers 220 may be connected to an external power amplifier 300 and playback device 400. The amplifier 300 and playback device 400 may function in substantially the same way as described above with regard to FIG. 1. Similarly, the playback device 400 may be configured to be controllable, allowing modification of qualities of the sound 130 during sonic infusion. The speaker(s) 220 disposed inside the barrel 110 may be connected to the power amplifier 300 and playback device 400 via a liquid-proof cable 228 which passes through a hole 240 in the barrel 110. According to exemplary embodiments of the present general inventive concept, this hole 240 is preferably sealed such that it is waterproof and airtight, thereby keeping the environment around the spirits 115 constant.

The above exemplary embodiments each have their own advantages. External speaker assembly 1000, in which spirits 115 are treated with one or more speakers 120 located outside of the barrel 110 as illustrated in FIG. 1, allows more room for the speakers 120, since the speakers 120 are not limited by the size of the barrel 110. Furthermore, if a liquid shield 160 is used, the speaker(s) 120 do not need to be waterproof. As a result, external speaker assembly 1000 has few restrictions on what kind of speakers 120 may be used. As a result, external speaker assembly 1000 may allow for more control over sound quality, available volume and frequency, etc.

In comparison, in internal speaker assembly 2000 the speaker(s) 220 are enclosed inside the barrel 110 as illustrated in FIG. 2. As a result the barrel 110 is more easily sealed against the outside environment, since a relatively smaller hole 240 must be cut in the barrel 110 to admit the liquid-proof cable 228, as compared to the hole 140 cut to allow an external speaker 120 to interact with the liquid 115. This helps to maintain a stable environment around the spirits 115, which is desirable for barrel-aging. Furthermore, when one or more speakers 220 are immersed in the spirits 115, the sound from the speaker(s) 220 may be more evenly distributed through the spirits 115 in the barrel 110, thereby causing the spirits 115 to interact with the barrel 110 more uniformly across the interior surface thereof. The speaker(s) 220 therefore may encourage more uniform barrel aging in the spirits 115. The even distribution of the sound waves 130 through the spirits 115 may also cause a different rate of interaction between the spirits 115 and the wood of barrel 110 than when an external speaker 120 is used instead.

FIG. 3 illustrates a sonic infusion system 3000 according another exemplary embodiment of the present general inventive concept. As illustrated therein, the same power amplifier 300 and playback device 400 may be used with a plurality of barrels 110. According to exemplary embodiments, in this system 3000 one or more barrels 110 may be configured similarly to FIG. 2, including one or more internal speakers 220 connected via a liquid-proof cable 228 extending from each barrel 110 to the power amplifier 300 and playback device 400. Furthermore, one or more barrels 110 may be configured similarly to FIG. 1, in which one or more external speakers 120 inside speaker enclosures 180 are placed on the outside of one or more barrels 110. As illustrated in FIG. 3, the speakers 120 and 220 of sonic infusion system 3000 may all use the same power amplifier 300 and playback device 400. The speaker(s) 120 may be connected to the power amplifier 300 and playback device 400 through cables passing through the speaker enclosures 180.

FIG. 4 illustrates a speaker assembly 4000 including speakers 120, 220 disposed both inside and outside of a barrel 110, to play sound waves 130 into the spirits 115. As illustrated therein, such a speaker assembly 3000 may include external speaker(s) 120 disposed in an enclosure 180 outside the barrel 110 as well as internal speaker(s) 220 disposed on an anchor point 225 inside the barrel 110. The speakers 120, 220 may use the same amplifier 300 and playback device 400, which may be disposed separately from the barrel 110. The speakers 120, 220 may also use the same hole 140 in the surface of the barrel, such that speaker(s) 120 may play sound waves 130 through the hole 140 and liquid-proof cable 228 may pass through the hole 140 to power the speaker(s) 220.

The speaker assembly 4000 may allow for relatively greater control over the sound 130 being used for sonic infusion of the spirits 115, since it allows for both more powerful external speaker(s) 120 and more uniform sound distribution into the spirits 115 through internal speaker(s) 220.

A variety of different sounds 130 may be played into the spirits 115 according to exemplary embodiments of the present general inventive concept. These sounds 130 may include, for example, exhaust notes from cars and motorcycles, airplane noises, turbines, boats, music, and natural events such as volcanic eruptions. According to exemplary embodiments of the present general inventive concept, the sound 130 may have frequencies in the range of about 60 Hz to about 4 kHz. More specifically, the sound 130 may have frequencies in the range of about 60 Hz to about 1.5 kHz.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:
1. A system to treat spirits with sound waves, the system comprising:

a wooden barrel configured to hold the spirits, the barrel comprising a barrel wall including a hole; and at least one speaker disposed in an enclosure attached to the barrel wall, the enclosure being disposed outside of the barrel and configured to form an airtight seal around the hole, the speaker being configured to play a repeated pattern of sound into the spirits inside the barrel through the hole in the barrel wall, the repeated pattern of sound being configured to encourage the spirits to interact with the wood of the barrel.

2. The system of claim 1, wherein the enclosure is formed of the same wood as the barrel.

3. The system of claim 1, further comprising at least one additional speaker disposed inside the barrel, the at least one additional speaker being configured to play the repeated pattern of sound into the spirits.

4. The system of claim 1, wherein the at least one speaker is configured to be waterproof.

5. The system of claim 1, wherein the repeated pattern of sound has a frequency ranging between about 60 Hz and about 4 KHz.

6. The system of claim 1, wherein the repeated pattern of sound is provided from a playback device in communication with the at least one speaker.

7. The system of claim 6, wherein the playback device is configured to receive a command to change qualities of the repeated pattern of sound.

8. The system of claim 7, wherein the qualities of the repeated pattern of sound include at least one of frequency, volume, and duration.

9. The system of claim 1, wherein the repeated pattern of sound is configured to cause the spirits to move in and out of the wood of the barrel wall.

10. The system of claim 1, wherein the enclosure comprises a soundproof seal configured to contain the repeated pattern of sound in an area of the spirits.

11. A system to treat spirits with sound waves, the system comprising:

a wooden barrel configured to hold the spirits;

a wooden anchor point removably disposed inside of the barrel, a first end of the anchor point being removably affixed to one wall of the barrel, and a second end of the anchor point extending from one end of the barrel towards a middle of the barrel and being unaffixed to the barrel, the barrel being sealed against an outside environment while the anchor point is disposed inside the barrel;

at least one speaker disposed on and supported by the anchor point, the at least one speaker being configured to play a repeated pattern of sound into the spirits inside the barrel, the repeated pattern of sound being configured to encourage the spirits to interact with the wood of the barrel; and a cable connected to the at least one speaker.

12. The system of claim 11, wherein the anchor point is formed of the same wood as the barrel.

13. The system of claim 11, wherein the anchor point is removably inserted into the barrel through an opening disposed in the wall of the barrel.

14. The system of claim 11, wherein the cable connecting to the at least one speaker passes through a hole in the barrel wall, the hole being sealed airtight while the anchor point is disposed inside the barrel.

15. The system of claim 11, wherein the at least one speaker is immersed in the spirits while the anchor point is disposed inside the barrel.

16. The system of claim 11, wherein the at least one speaker is disposed on the second end of the anchor point.

17. The system of claim 11, further comprising an opening in the wall of the barrel to which the first end of the anchor point is affixed;

wherein the anchor point is inserted into the barrel through the opening in the wall of the barrel.

18. A method of treating spirits in a wooden barrel, the method comprising:

disposing at least one speaker in an enclosure attached to a wall of the barrel, the enclosure being disposed outside of the barrel and configured to form an airtight seal around a hole in the wall of the barrel; and playing a repeated pattern of sound through the speaker and into the spirits inside the barrel through the hole in the wall of the barrel, the repeated pattern of sound being configured to encourage the spirits to interact with the wood of the barrel.

19. The method of claim 18, further comprising providing a soundproof seal in the enclosure, the soundproof seal being configured to contain the repeated pattern of sound in an area of the spirits.

* * * * *